US012766973B2

(12) United States Patent
Hall et al.

(10) Patent No.: US 12,766,973 B2
(45) Date of Patent: Oct. 20, 2026

(54) METHOD FOR DETERMINING A RESOLVER OFFSET

(71) Applicant: VOLVO TRUCK CORPORATION, Gothenburg (SE)

(72) Inventors: Sebastian Hall, Gothenburg (SE); Andreas Gillström, Västra Frölunda (SE); Yifei Hu, Gothenburg (SE); Jonas Ottosson, Falkenberg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 34 days.

(21) Appl. No.: 18/746,946

(22) Filed: Jun. 18, 2024

(65) Prior Publication Data

US 2024/0424910 A1 Dec. 26, 2024

(30) Foreign Application Priority Data

Jun. 20, 2023 (EP) .................................... 23180413

(51) Int. Cl.
*B60L 15/02* (2006.01)

(52) U.S. Cl.
CPC .................................... *B60L 15/02* (2013.01)

(58) Field of Classification Search
CPC .. B60L 15/02; H02P 21/32; H02P 6/17; H02P 21/18; H02P 2203/03; G01B 7/30
See application file for complete search history.

(56) References Cited

U.S. PATENT DOCUMENTS

| | | | | |
|---|---|---|---|---|
| 2008/0272731 A1* | 11/2008 | Schulz | H02P 21/06 | 318/609 |
| 2012/0019179 A1* | 1/2012 | Yamada | G01D 5/24485 | 318/400.04 |
| 2014/0285125 A1* | 9/2014 | Kato | H02P 21/141 | 318/721 |
| 2015/0048765 A1* | 2/2015 | Park | H02P 21/14 | 318/400.02 |

(Continued)

FOREIGN PATENT DOCUMENTS

| | | |
|---|---|---|
| CN | 109327173 A | 2/2019 |
| CN | 110855210 A | 2/2020 |

(Continued)

OTHER PUBLICATIONS

Machine translation of JP-2013238431-A (Year: 2013).*

(Continued)

*Primary Examiner* — Navid Z. Mehdizadeh
*Assistant Examiner* — Caitlin R McCleary
(74) *Attorney, Agent, or Firm* — Jeffri A. Kaminski; Venable LLP

(57) ABSTRACT

A computer system is provided. The computer system comprises processing circuitry configured to: for each one of a pre-set positive speed value and a pre-set negative speed value: controlling the speed of an electrical machine to the pre-set speed value, short circuiting the electrical machine, and determining d,q currents and angular velocity of a rotor of the electrical machine during deceleration from the pre-set speed value, and wherein the processing circuitry is further configured to: determining a resolver offset based on the determined d, q currents and the determined angular velocity of the rotor.

18 Claims, 7 Drawing Sheets

(56) References Cited

U.S. PATENT DOCUMENTS

| | | | |
|---|---|---|---|
| 2021/0067069 | A1 | 3/2021 | Iezawa et al. |

FOREIGN PATENT DOCUMENTS

| | | | | |
|---|---|---|---|---|
| DE | 102022108092 | A1 | | 10/2022 |
| JP | 2013238431 | A | * | 11/2013 |

OTHER PUBLICATIONS

Extended European Search Report in corresponding European Application No. 23180413.9 dated Nov. 30, 2023 (8 pages).

Siwei Cheng et al, "Self identification and compensation of position sensor error in interior permanent magnet synchronous machine (IPMSM) drives," 2014 17th International Conference on Electrical Machines and Systems (ICEMS), IEEE (Institute of Electrical and Electronics Engineers), Hangzhou, China, Oct. 22, 2014, pp. 2734-2737, DOI: 10.1109/ICEMS.2014.7013963.

* cited by examiner

METHOD FOR DETERMINING A RESOLVER OFFSET

TECHNICAL FIELD

The disclosure relates generally to electrical machines. In particular aspects, the disclosure relates to a method for determining a resolver offset. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Electrical machines are used in a vast amount of applications. By applying position control of the electrical machine a number of benefits are obtained.

Especially in electrical vehicle applications, position control will allow for improved efficiency by enabling precise control of the speed and torque of the electrical machine. Hence, the electrical machine may operate at optimal efficiency for a given speed and load thereby extending the range of the vehicle and improving overall energy efficiency of the electric vehicle.

Another benefit relates to improved performance and driving experience. Accurate information about the rotor position will enable precise control of the position, speed, and torque of the electrical machine thereby allowing for faster acceleration, smoother operation, and better handling.

A further benefit of position control is related to reduction of wear and tear of the electrical machine, thereby prolonging the lifetime as the electrical machine can be driven at optimal efficiency.

Precise control of the moving parts of an electrical machine may be realized by a number of different devices, such as by encoders, Hall effect sensors, linear variable differential transformers, and laser displacement sensors. However, when considering factors such as accuracy, resolution, reliability, immunity to electromagnetic interference, size, and complexity a resolver is normally the first hand choice.

A resolver is a type of sensor that is used to determine the position and speed of a rotating shaft of an electrical machine. A resolver operates by converting the mechanical motion of the shaft into an electrical signal that is indicative of the position and speed of the electrical machine.

A resolver consists of a stator and a rotor. The stator has sets of coils which are typically positioned at specific angles. The rotor is a rotating component that also contains sets of coils, which are positioned around the rotor at specific angles to match the positions of the stator coils. While the stator is a stationary component, the rotor is connected to the rotating shaft of the electrical machine.

When the rotor rotates as the electrical machine is running, voltages will be induced in the stator coils that are proportional to the sine and cosine of the angle between the rotor and stator coils of the resolver. These voltages are then processed to determine the position and speed of the rotating shaft.

As is understood from the above background, correct positioning of the resolver is critical in order to benefit from precise position control.

Insufficient calibration of the resolver position may lead to decreased performance and may jeopardize the control of the electrical machine. Accurate calibration of the resolver, i.e. knowing any present resolver offset, is consequently important to assure satisfying performance of the electrical machine, and specifically to assure the desired performance of the electric vehicle when applicable.

Hence, there is a need for improvements for calibrating a resolver of an electrical machine, and especially there is a need for improved methods for determining a resolver offset.

SUMMARY

According to a first aspect of the disclosure, a computer system is provided. The computer system comprises processing circuitry configured to, for each one of a pre-set positive speed value and a pre-set negative speed value, controlling the speed of an electrical machine to the pre-set speed value, short circuiting the electrical machine, and determining d,q currents and angular velocity of a rotor of the electrical machine during deceleration from the pre-set speed value. The processing circuitry is further configured to determining a resolver offset based on the determined d, q currents and the determined angular velocity of the rotor. A technical benefit may include the possibility to determine a constant resolver offset as well as a speed dependent resolver offset in a very efficient manner, thereby enabling improved calibration of the resolver position for more accurate control of the electrical machine.

Optionally in some examples, including in at least one preferred example, short-circuiting the electrical machine is performed by short-circuiting each phase winding of the electrical machine.

Optionally in some examples, including in at least one preferred example, the absolute value of the negative speed value equals the absolute value of the positive speed value. A technical benefit may include more a more simple process for determining the resolver offset.

Optionally in some examples, including in at least one preferred example, the processing circuitry is further configured to disconnecting the electrical machine from an associated load prior to controlling the speed of the electrical machine to the pre-set speed values. A technical benefit may include the possibility to track the induced voltage of the electrical machine to align the resolver to a rotating coordinate system, i.e. a dq frame.

Optionally in some examples, including in at least one preferred example, the processing circuitry is further configured to calculating a correct resolver position by subtracting the resolver offset from the estimated resolver position. A technical benefit may include a more accurate resolver position, thereby allowing improved control of the electrical machine.

Optionally in some examples, including in at least one preferred example, the processing circuitry is further configured to controlling operation of the electrical machine based on the correct resolver position. A technical benefit may include improved operation of the electrical machine. Especially in vehicle applications this may allow for better performance and efficiency of the associated vehicle.

Optionally in some examples, including in at least one preferred example, the processing circuitry is further configured to determining the resolver offset as a constant angular resolver offset and a speed-dependent angular resolver offset. A technical benefit may include that misalignments caused by both speed-independent and speed-dependent phenomena are addressed, thereby allowing the computer system to be particularly suitable for resolver signal demodulations that use delta-sigma A/D converters when obtaining the cosine and sine signals from the resolver.

Optionally in some examples, including in at least one preferred example, the processing circuitry is further configured to determining the constant angular resolver offset as $$\theta_{off}=\frac{\arctan2(i_q(\omega),\ i_d(\omega))+\arctan2(i_q(-\omega),\ i_d(-\omega))}{2}-\pi.$$

A technical benefit may include a more efficient routine to determine the constant angular resolver offset when data is available for both positive and negative angular velocities when the electrical machine is short circuited and when the parameters of the electrical machine are known.

Optionally in some examples, including in at least one preferred example, the processing circuitry is further configured to determining the speed-dependent angular resolver offset as kω, where $$k=\frac{1}{2\omega}\left(\arctan2(i_q(\omega),\ i_d(\omega))-\arctan2(i_q(-\omega),\ i_d(-\omega))-\arctan2\left(-\psi_{PM}\frac{R}{L_dL_q\omega+\frac{R^2}{\omega}},\ -\psi_{PM}\frac{L_q}{L_dL_q+\frac{R^2}{\omega^2}}\right)+\arctan2\left(-\psi_{PM}\frac{R}{-L_dL_q\omega+\frac{R^2}{-\omega}},\ -\psi_{PM}\frac{L_q}{L_dL_q+\frac{R^2}{\omega^2}}\right)\right).$$

A technical benefit may include a more efficient routine to determine the constant angular resolver offset when data is available for both positive and negative angular velocities when the electrical machine is short circuited and when the parameters of the electrical machine are known.

Optionally in some examples, including in at least one preferred example, the absolute value of the negative speed value equals the absolute value of the positive speed value, and the processing circuitry is further configured to disconnecting the electrical machine from an associated load prior to controlling the speed of the electrical machine to the pre-set speed values; calculating a correct resolver position by subtracting the resolver offset from the estimated resolver position; controlling operation of the electrical machine based on the correct resolver position; determining the resolver offset as a constant angular resolver offset and a speed-dependent angular resolver offset; determining the constant angular resolver offset as $$\theta_{off}=\frac{\arctan2(i_q(\omega),\ i_d(\omega))+\arctan2(i_q(-\omega),\ i_d(-\omega))}{2}-\pi;$$

and determining the speed-dependent angular resolver offset ( ) as kω, where $$k=\frac{1}{2\omega}\left(\arctan2\ (i_q(\omega),\ i_d(\omega))-\arctan2\ (i_q(-\omega),\ i_d(-\omega))-\right.$$

-continued $$\left.\arctan2\left(-\psi_{PM}\frac{R}{L_dL_q\omega+\frac{R^2}{\omega}},\ -\psi_{PM}\frac{L_q}{L_dL_q+\frac{R^2}{\omega^2}}\right)+\arctan2\left(-\psi_{PM}\frac{R}{-L_dL_q\omega+\frac{R^2}{-\omega}},\ -\psi_{PM}\frac{L_q}{L_dL_q+\frac{R^2}{\omega^2}}\right)\right).$$

According to a second aspect of the disclosure, a vehicle is provided. The vehicle comprises the computer system according to the first aspect. The second aspect of the disclosure may seek to allow for a better performance and efficiency of the vehicle. A technical benefit may include improved control of the electrical machine of the vehicle.

Optionally in some examples, including in at least one preferred example, the vehicle comprises an electrical machine comprising a resolver and at least one load connected to the electrical machine. The computer system is configured to determine the constant angular resolver offset and the speed-dependent angular resolver offset of the resolver of the electrical machine. As previously stated, a technical benefit may include that misalignments caused by both speed-independent and speed-dependent phenomena are addressed, thereby allowing the computer system to be particularly suitable for resolver signal demodulations that use delta-sigma A/D converters when obtaining the cosine and sine signals from the resolver.

According to a third aspect of the disclosure, a computer-implemented method is provided. The method comprises, for each one of a pre-set positive speed value and a pre-set negative speed value: controlling, by the processing circuitry, the speed of an electrical machine to the pre-set speed value, short circuiting, by the processing circuitry, the electrical machine, and determining, by the processing circuitry, d,q currents and angular velocity of a rotor of the electrical machine during deceleration from the pre-set speed value. The method further comprises determining, by the processing circuitry, a resolver offset based on the determined d, q currents and the determined angular velocity of the rotor.

Optionally in some examples, including in at least one preferred example, the method further comprises allowing the electrical machine to rotate freely during deceleration from the pre-set speed values. A technical benefit may include a less complex calculation of the resolver offset as the d and q currents will not depend on any load characteristics.

Optionally in some examples, including in at least one preferred example, the method further comprises short circuiting, by the processing circuitry, the windings of the electrical machine. A technical benefit may include reducing time-dependent ripples on the phase currents since an associated inverter does not have to switch transistors on and off. Therefore, the measurements of the currents give very accurate values in regard to the mean value of the currents over one sampling period.

Optionally in some examples, including in at least one preferred example, the method further comprises determining, by the processing circuitry, the resolver offset based on the determined d, q currents for the positive speed values and the negative speed values, and based on the determined angular velocity of the rotor for the positive speed values and the negative speed values. A technical benefit may include an efficient obtaining of all required parameters in order to accurately determine the resolver offset.

Optionally in some examples, including in at least one preferred example, the method further comprises determining, by the processing circuitry, d,q currents by estimating the steady-state d, q voltages as zero. A technical benefit may include a more simple model for determining the resolver offset.

Optionally in some examples, including in at least one preferred example, the method further comprises calculating a correct resolver position by subtracting the resolver offset from the estimated resolver position. A technical benefit may include a more accurate resolver position, thereby allowing improved control of the electrical machine.

Optionally in some examples, including in at least one preferred example, the method further comprises disconnecting, by the processing circuitry, the electrical machine from an associated load prior to controlling the speed of the electrical machine to the pre-set speed values, and calibrating, by the processing circuitry, the resolver position based on the resolver offset. A technical benefit may include, as previously mentioned, improved operation of the electrical machine. Especially in vehicle applications this may allow for better performance and efficiency of the associated vehicle.

According to a fourth aspect of the disclosure, a computer program product is provided. The computer program product comprises program code for performing, when executed by the processing circuitry, the method according to the third aspect of the disclosure.

According to a fifth aspect of the disclosure, a non-transitory computer-readable storage medium is provided. The non-transitory computer-readable storage medium comprises instructions, which when executed by the processing circuitry, cause the processing circuitry to perform the method according to the third aspect of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

Before describing specific details of the technology of this disclosure, some general comments on control of electrical machines will be given.

The dq frame is a mathematical tool used to simplify the analysis and control of electrical machines, such as electric motors or generators.

The dq frame is a coordinate system that rotates with the rotor of the electrical machine, with the d-axis aligned with the magnetic field from the permanent magnets in the rotor, i.e. the magnetization field, and the q-axis 90 degrees ahead of the d-axis. By transforming the three-phase electrical quantities of the machine (i.e. with regards to voltage and current) from the stationary orthogonal frame to the rotating dq frame, it is possible to represent the behavior of the electrical machine as a set of two variables, i.e. the direct-axis (d-axis) and the quadrature-axis (q-axis) components.

The d-axis and the q-axis components may represent any electrical or magnetic quantity (such as current, voltage, or flux) that changes in a three-phase system when the phases are shifted 120 degrees in space and time.

Using the dq frame, it is possible to control the behavior of the electrical machine with regards to speed and torque output by manipulating the d-axis and q-axis components of the voltage and current.

A commonly used way to control electrical machines is called field-oriented control (FOC). FOC involves adjusting the d-axis and q-axis components to control the machine's magnetic field. By adjusting these components in real-time, it is possible to maintain a desired speed or torque output from the machine.

FOC requires the position of the rotor as an input. For this purpose, a resolver may be arranged at the rotor shaft, providing resolver signals indicative of the position of the rotor. Nevertheless, a mechanical resolver offset, which is speed-independent, may exist due to the imbalance of mechanical tolerance during the resolver assembly on the rotor shaft.

Another issue that may be associated with resolvers is related to the analog-to-digital conversion of the resolver signals. One common method when performing the analog-to-digital conversion of the resolver signals is to use delta-sigma modulation, which typically includes an initial encoding of the analog signal using high-frequency delta-sigma modulation, and a subsequent digital filtering to form a high-resolution/low sample-frequency digital output. This conversion technique normally comes with an intrinsic delay causing a speed-dependent offset of the resolver signal.

The speed-independent offset and the speed-dependent offset will cause errors that may lead to an inaccurate determination of the rotor position, which errors may affect the control and efficiency of the electrical machine negatively.

Figure 1:
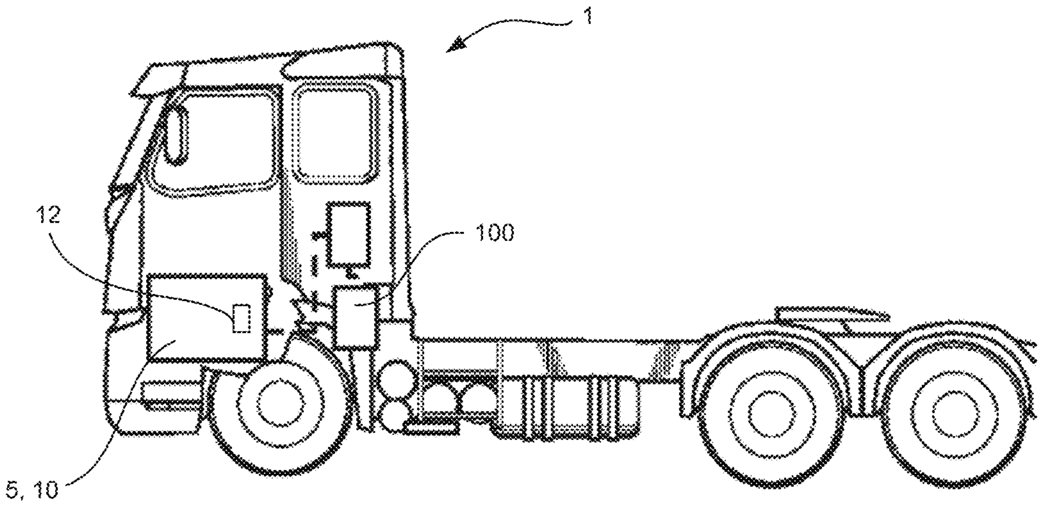
FIG. 1 is a side view of a vehicle comprising a computer system according to an example.

FIG. 1 is an exemplary system diagram of a vehicle 1 according to an example. The vehicle 1 may be any type of vehicle, such as a heavy duty vehicle or a light duty vehicle. The vehicle 1 comprises an electrical machine arrangement 5. The electrical machine arrangement 5 comprises an electrical machine 10 being provided with a resolver 12, and a computer system 100 being configured to determine a resolver offset of the electrical machine 10 as will be further explained in the following. In FIG. 1, the electrical machine arrangement 5 and its included components are shown schematically.

It should be emphasized that the computer system 100 described herein is not exclusively designed to operate with a vehicle 1, but the computer system 100 may be used in any suitable application, such as moving or stationary applications, embedded or stand-alone applications, etc., as long as it is connected to an electrical machine 10 and forms part of an electrical machine arrangement 5.

Figure 2:
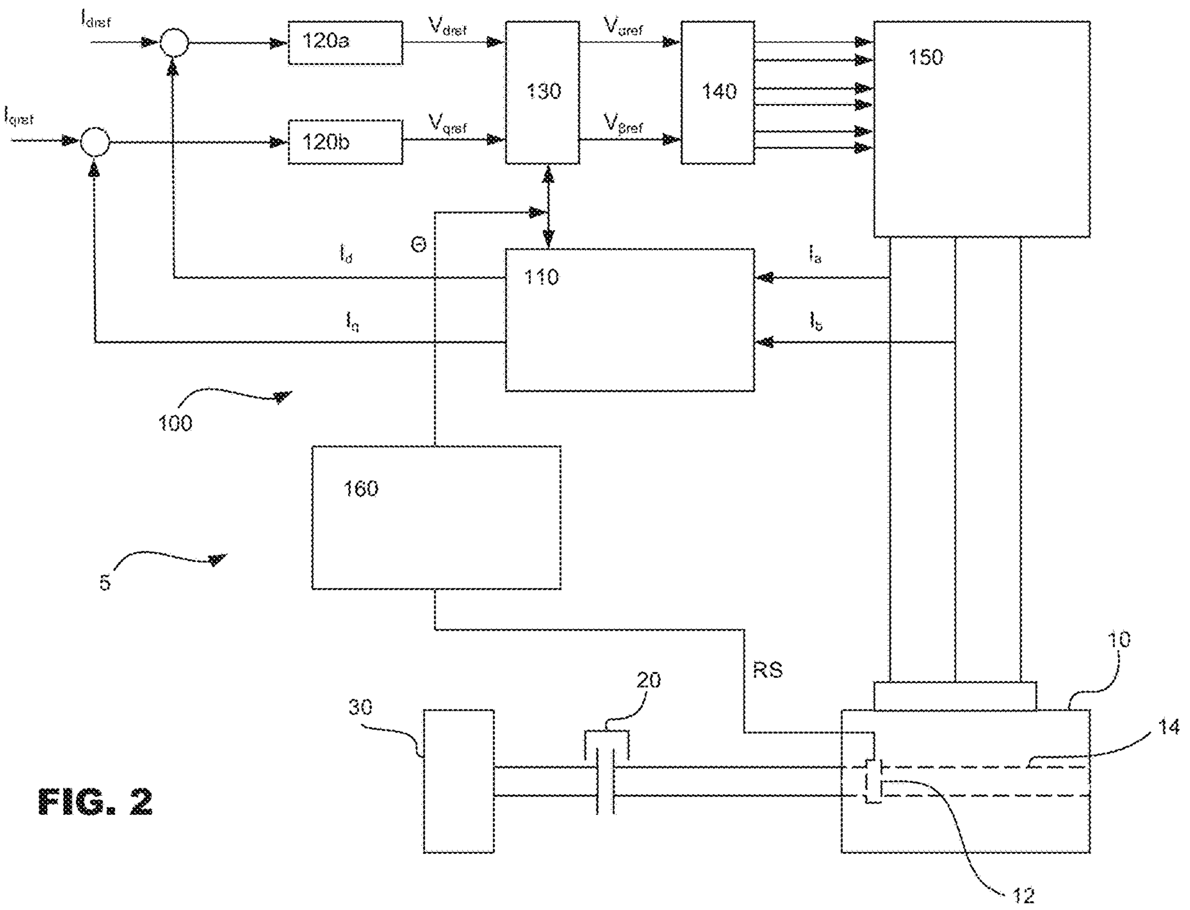
FIG. 2 is an exemplary system diagram of a computer system according to an example.

FIG. 2 is an exemplary system diagram of an electrical machine arrangement 5. The electrical machine arrangement 5 comprises an electrical machine 10. The electrical machine 10 is provided with a resolver 12 configured to transmit a resolver signal RS being indicative of the current position of a rotor 14 of the electrical machine 10.

The electrical machine arrangement 5 further comprises a computer system 100. The computer system 100 is programmed to determine the resolver offset of the resolver 12. The computer system 100 is further configured to allow field-oriented control (FOC) of the electrical machine 10. The computer system 100 comprises a transformation circuitry 110 configured to measure and transform the motor phase currents to the dq frame, resulting in measured dq frame currents $I_d$ and $I_q$. These transformed currents $I_d$ and $I_q$ are compared to reference currents $I_{dref}$ and $I_{qref}$ (i.e. the flux reference and the torque reference) by regulators 120*a*, 120*b*, outputting reference voltages $V_{dref}$ and $V_{qref}$ in the dq frame. An inverse transformation circuitry 130 is configured to invert the reference voltages $V_{dref}$ and $V_{qref}$ to the voltage components $V_{\alpha ref}$ and $V_{\beta ref}$ of the stator vector voltage in the stationary orthogonal reference frame. These reference voltages are inputs to a space vector pulse-width modulator 140 which is configured to provide drive signals to an inverter 150.

Each of the transformation circuitry 110 and the inverse transformation circuitry 130 requires the rotor flux position $\theta$, which depends on the position of the rotor. While the rotor flux position can be provided from the signals of the resolver 12, any built-in error in the resolver 12 will cause control errors which may affect operation of the electrical machine 10 negatively.

For this purpose, the computer system 100 is configured to determine these built-in errors of the resolver 12 according to a general principle which will be further explained in the following.

The electrical machine arrangement 5 comprises a disconnect clutch 20 which is arranged to allow disconnection of the electrical machine 10 from any load 30 connected to it. In a vehicle application, such load may typically be a wheel, a speed reducer, or a differential mechanism.

The computer system 100 is configured to control disconnection of the disconnect clutch 20 such that the electrical machine 10 can rotate freely without driving any load 30.

The computer system 100 comprises computing and/or processing circuitry 160 being configured to determine the resolver offset according to a method 200 generally described with reference to FIG. 5.

It should be noted that the computing circuitry 160, as well as any processing circuitry programmed to perform the method 200, could be implemented as embedded software and/or hardware with a computer system 100 configured to control the operation of the electrical machine 10. However, the computing circuitry 160, as well as any processing circuitry programmed to perform the method 200, could in other examples be implemented as a stand-alone application. Hence, calculation of the offset of the resolver 12 could be performed as part of the normal operation control of the electrical machine 10, or for example only once during production, preferably at the end of line of manufacturing.

The general idea is to perform measurements of the phase currents in the armature windings, and of the angular position of the rotor of the machine. The winding currents are transformed into a rotating reference frame synchronized with the rotor using measurements of the angular position of the rotor given by the resolver. During the data acquisition, the phase windings of the machine are short circuited while the machine rotates in different directions. Both speed dependent and speed independent angle offsets are derived from the aforementioned measurements.

The technical concept provides a number of advantages. First, since the machine is short-circuited the inverter 150 does not switch transistors on and off. Consequently, there are no time-dependent ripples on the phase currents. Therefore, the measurements of the currents give very accurate values in regard to the mean value of the currents over one sampling period.

Secondly, the method addresses misalignments caused by both speed-independent and speed-dependent phenomena by taking a constant angular offset and a speed-dependent delay of the resolver signal input into account. This makes the method particularly suitable for resolver-signal demodulations that use delta-sigma A/D converters when obtaining the cosine and sine signals from resolver.

Figure 3A:
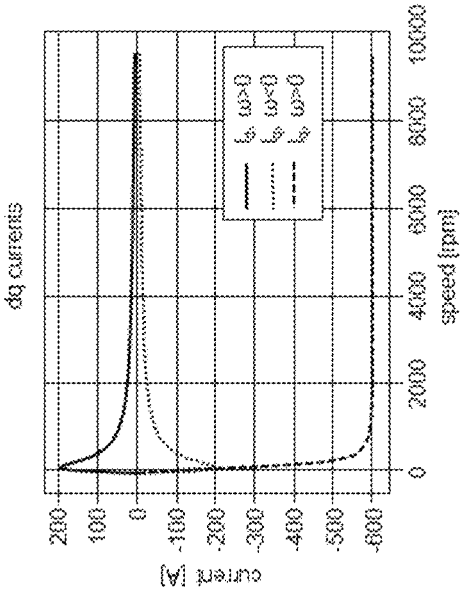
FIG. 3A is a diagram showing the dq currents as a function of rotational speed with no resolver offset present.

FIG. 3A shows a diagram in which dq currents are plotted for a short circuited electrical machine 10 with a perfect resolver 12 position, i.e. a constant angular resolver offset and a speed-dependent angular resolver offset are both equal to zero.

Figure 3B:
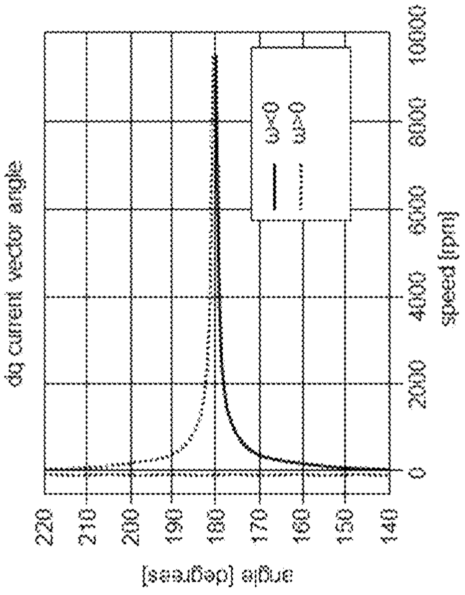
FIG. 3B is a diagram showing the current load angle as a function of rotational speed with no resolver offset present.

FIG. 3B shows a similar diagram, but in which dq current load angles are plotted for a short circuited electrical machine 10 with a perfect resolver 12 position, i.e. a constant angular resolver offset and a speed-dependent angular resolver offset are both equal to zero.

Figure 4A:
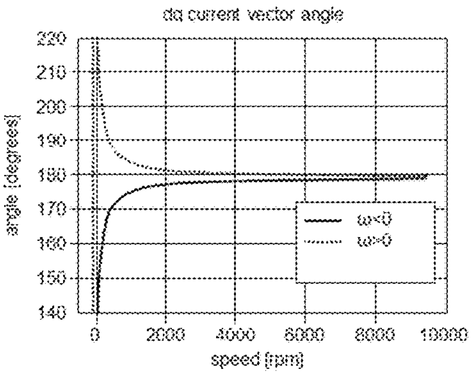
FIG. 4A is a diagram showing the current load angle as a function of rotational speed with a time-independent resolver offset present.

FIG. 4A shows another diagram in which dq current load angles are plotted for a short circuited electrical machine 10 with a non-calibrated resolver 12 position, in this case a constant angular resolver offset is non-zero while a speed-dependent angular resolver offset equals to zero.

Figure 4C:
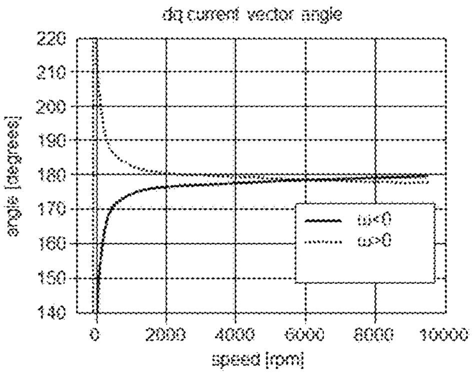
FIG. 4C is a diagram showing the current load angle as a function of rotational speed with a time-independent resolver offset and a time-dependent resolver offset present.
Figure 4B:
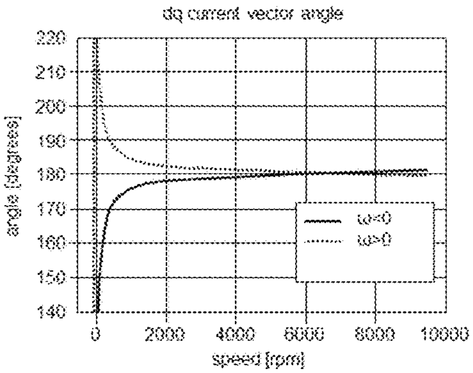
FIG. 4B is a diagram showing the current load angle as a function of rotational speed with a time-dependent resolver offset present.

FIG. 4B shows a similar diagram in which dq current load angles are plotted for a short circuited electrical machine 10 with a non-calibrated resolver 12 position, in this case a constant angular resolver offset equals to zero while a speed-dependent angular resolver offset is non-zero.

FIG. 4C shows another diagram in which dq current load angles are plotted for a short circuited electrical machine 10 with a non-calibrated resolver 12 position, in this case a constant angular resolver offset and a speed-dependent angular resolver offset are both non-zero.

Figure 5:
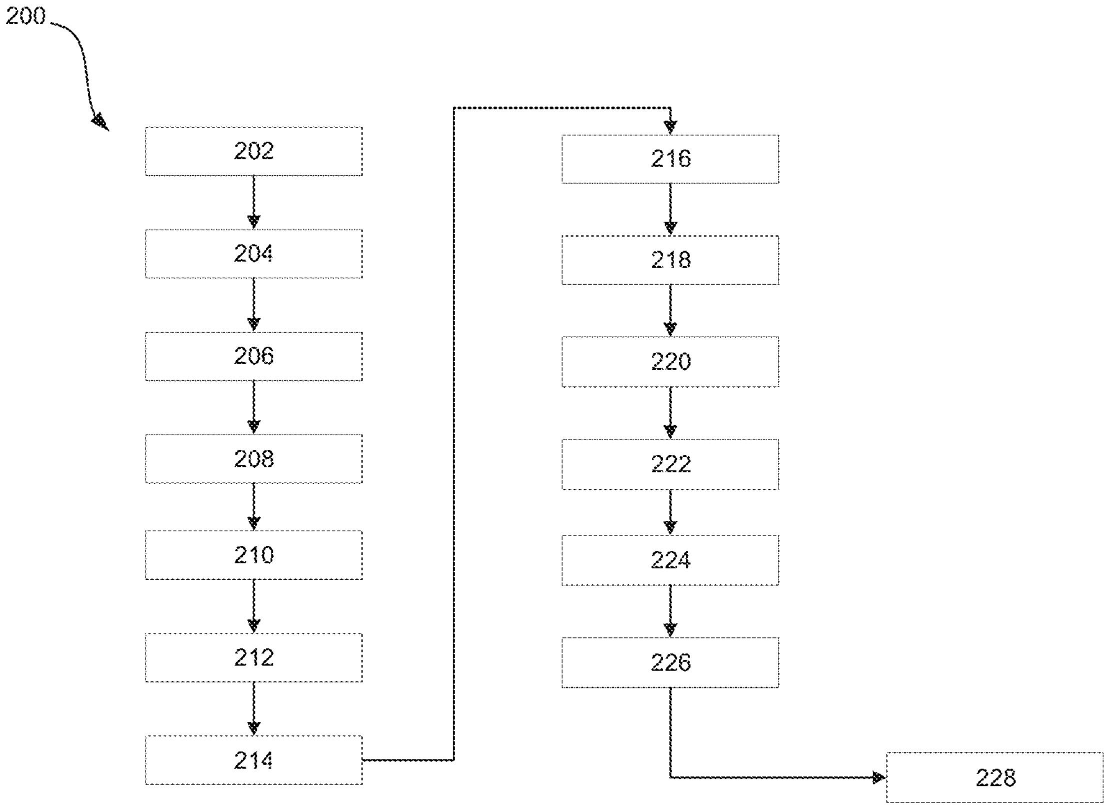
FIG. 5 is flow chart of an exemplary method to determine resolver errors according to an example.

As shown in FIG. 5, the method 200 operates by an initial control 202 of the disconnect clutch 20 to a disconnected state. The method 200 is then applying 204 FOC to the electrical machine 10, such as speed control or torque control, such that the electrical machine 10 is accelerated 206 to a pre-set high speed value core $\omega_{ref}$, such as 10000 rpm.

When the electrical machine 10 has reached its target speed the stator windings of the electrical machine 10 are short circuited 208. Due to the braking torque, friction, and losses the electrical machine 10 will start to decelerate 210 from the target speed $\omega_{ref}$.

During deceleration from an upper speed to a lower speed, i.e. during a speed interval, the method 200 acquires 212 measured currents $i_d(\omega)$, $i_q(\omega)$ of the electrical machine 10 as well as the rotational speed a of the electrical machine 10. The speed interval may e.g. be from 10000 rpm to 6000 rpm, or the speed interval may be indirectly set by a pre-set amount of deceleration time.

When the d,q currents $i_d(\omega)$, $i_q(\omega)$ of the electrical machine 10 and the rotational speed a of the electrical machine 10 are determined during deceleration from the pre-set high-speed value $\omega_{ref}$, the method 200 continues by resetting 214 the high-speed value to $-\omega_{ref}$. For this new reference value, the method repeats itself by applying 216 FOC to the electrical machine 10 such that the electrical machine 10 is accelerated 218 to the new pre-set high speed value $-\omega_{ref}$. Upon reaching the new pre-set high speed value $-\omega_{ref}$ the electrical machine 10 is short-circuited 220 whereby the electrical machine 10 is beginning to decelerate 222.

During deceleration 222 from an upper speed to a lower speed, i.e. during a speed interval, the method 200 acquires 224 measured currents $i_d(\omega)$, $i_q(\omega)$ of the electrical machine 10 as well as the rotational speed a of the electrical machine 10. As for the previous acquiring 212 of data, the speed interval may e.g. be from −10000 rpm to −6000 rpm, or the speed interval may be indirectly set by a pre-set amount of deceleration time.

Once the d,q currents have been obtained for positive and negative rotational speeds $\omega$, the method 200 continues by post-processing 226 of the acquired data. This results in a calculated constant angular resolver offset $\theta_{off}$ and a speed-dependent angular resolver offset k.

Optionally, the method 200 further comprises controlling 228 the electrical machine 10 using a calibrated resolver position $\theta_{cal}$, wherein $\theta_{cal}=\theta_{meas}-\theta_{off}-k\omega$.

The calibration method 200 described above starts by transforming the measured phase currents into an orthogonal coordinate system, i.e. the dq frame or the dq coordinate system, which is aligned with the magnetic flux from the permanent magnets in the rotor. Mathematically the transformation is defined as:

$$\begin{bmatrix} i_d \\ i_q \end{bmatrix} = \begin{bmatrix} \cos(\theta) & \cos\left(\theta - \frac{2\pi}{3}\right) & \cos\left(\theta + \frac{2\pi}{3}\right) \\ -\sin(\theta) & -\sin\left(\theta - \frac{2\pi}{3}\right) & -\sin\left(\theta + \frac{2\pi}{3}\right) \end{bmatrix} \begin{bmatrix} i_a \\ i_b \\ i_c \end{bmatrix}.$$

The steady-state voltages in the dq system are defined as:

$$\begin{bmatrix} u_d \\ u_q \end{bmatrix} = \begin{bmatrix} R & -L_q\omega \\ L_d\omega & R \end{bmatrix} \begin{bmatrix} i_d \\ i_q \end{bmatrix} + \begin{bmatrix} 0 \\ \psi_{PM}\omega \end{bmatrix},$$

where $L_d$ and $L_q$ are the inductances in the d and q direction, R is the stator resistance, $\psi_{PM}$ is the linked magnetic flux from the permanent magnets and $\omega$ is the angular velocity of the rotor times the pole pair number.

If the machine is short circuited the voltages are zero. Under this condition, the dq currents can be estimated by:

$$i_d = -\psi_{PM} \frac{L_q}{L_d L_q + \frac{R^2}{\omega^2}},$$

and $$i_q = -\psi_{PM} \frac{R}{L_d L_q \omega + \frac{R^2}{\omega}}.$$

Supposing that all variables in the above equations are constant except the angular velocity, the short-circuit currents can be estimated for all velocities. The above equations show that for a certain angular velocity, the $i_d$ current is the same regardless of the rotational direction. Furthermore, the magnitude of the $i_q$ currents will be the same, but the sign differs dependent on the sign of the velocity. The two equations above also show that $i_d$ is always negative and $i_q$ approaches zero when the speed increases. Again referring to FIGS. 3A and 3B, FIG. 3A shows simulated currents over the whole speed range for a short-circuited machine 10 with a perfect resolver angle, while FIG. 3B shows the load angle of the current, which is defined as arctan $2(i_q,i_d)$. As expected, in FIGS. 3A and 3B the currents and the load angle are symmetric around the d axis over the whole speed range.

An erroneous offset of the resolver angle can advantageously be divided into two parts, one that is a constant offset over the whole speed range (typically a misalignment of the resolver in regard to the machine) and one that depends linearly on the angular velocity (typically a time delay, imposed by e.g. filters). Mathematically, the erroneous angular position is defined as:

$$\theta_e = \theta + \theta_{off} + k\omega,$$

where $\theta_{off}$ is the constant angular offset, k is the time delay constant and $\theta$ is the actual angular position of the rotor. Hence, $k\omega$ represent the time-dependent angular resolver offset. If there is an offset in the rotor angle, the short-circuit dq currents are no longer symmetric around the d axis. Consequently, it is possible to track an insufficiently calibrated resolver angle by analyzing the load angle of dq currents. Again referring to FIGS. 4A-C, three examples of short-circuit current load angles over the whole speed range are shown. In FIG. 4A, the resolver angle has a constant offset over the whole speed range; in FIG. 4B, there is a time delay; in FIG. 4C there are both a constant offset and a time delay. The constant angle offset creates a constant offset in the current load angle over the whole speed sequence (FIG. 4A) while the time delay creates a load angle that has speed-dependent offsets that are symmetric over the d axis (FIG. 4B). Since the two phenomena are independent it is possible to separate them when finding the offsets for an arbitrary speed.

With a correct angle, considering $0\leq\theta<2\pi$ the following equations should be satisfied:

$$\frac{\text{arctan2}(i_q(\omega), i_d(\omega)) + \text{arctan2}(i_q(-\omega), i_d(-\omega))}{2} = \pi,$$

-continued and $$\arctan2\,(i_q(\omega),\, i_d(\omega)) + \arctan2\,(i_q(-\omega),\, i_d(-\omega)) = \arctan2\left(-\psi_{PM}\frac{R}{L_dL_q\omega + \frac{R^2}{\omega}},\, -\psi_{PM}\frac{L_q}{L_dL_q + \frac{R^2}{\omega^2}}\right) - \arctan2\left(-\psi_{PM}\frac{R}{-L_dL_q\omega + \frac{R^2}{-\omega}},\, -\psi_{PM}\frac{L_q}{L_dL_q + \frac{R^2}{\omega^2}}\right).$$

Consequently, an offset or a time delay for a specific speed can be estimated by:

$$\theta_{off} = \frac{\arctan2(i_q(\omega),\, i_d(\omega)) + \arctan2(i_q(-\omega),\, i_d(-\omega))}{2} - \pi,$$

and $$k = \frac{1}{2\omega}\left(\arctan2\,(i_q(\omega),\, i_d(\omega)) - \arctan2\,(i_q(-\omega),\, i_d(-\omega)) - \left(\arctan2\left(-\psi_{PM}\frac{R}{L_dL_q\omega + \frac{R^2}{\omega}},\, -\psi_{PM}\frac{L_q}{L_dL_q + \frac{R^2}{\omega^2}}\right) + \arctan2\left(-\psi_{PM}\frac{R}{-L_dL_q\omega + \frac{R^2}{-\omega}},\, -\psi_{PM}\frac{L_q}{L_dL_q + \frac{R^2}{\omega^2}}\right)\right)\right).$$

The method 200 is thus programmed to determine 226 the constant angular resolver offset $\theta_{off}$, and to determine 226 the time-dependent angular resolver offset $k\omega$. Therefore, the constant angular offset and the time delay can be estimated if data is available for both positive and negative angular velocities when the machine is short circuited and the machine parameters are known.

When these parameters are known, it is possible to obtain a more accurate value of the rotor position, thereby improving control of the electrical machine 10.

Figure 6:
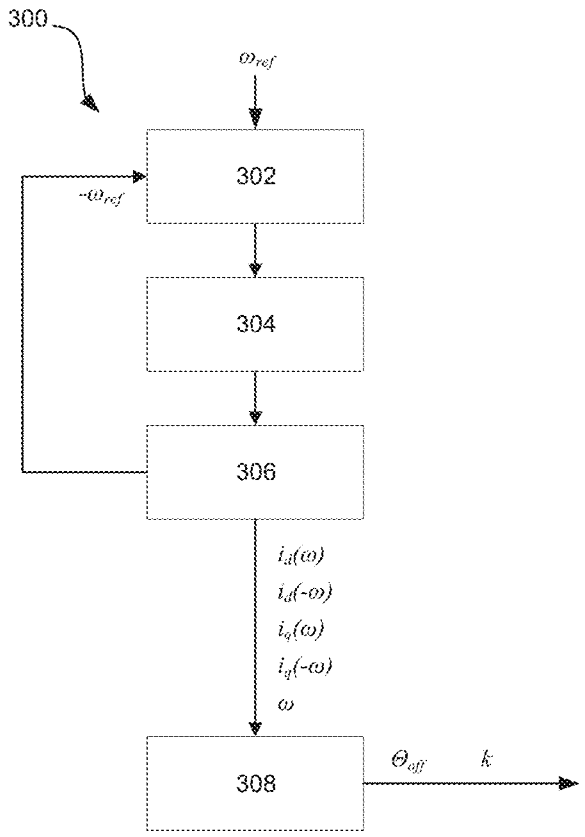
FIG. 6 is a flow chart of an exemplary method to determine resolver errors according to an example.

FIG. 6 is a flow chart of a method 300 to determine resolver errors according to an example. The method 300 is configured to, for each one of a pre-set positive speed value $\omega_{ref}$ and a pre-set negative speed value $-\omega_{ref}$, controlling 302 the speed of an electrical machine 10 to the pre-set speed value $\omega_{ref}$, $-\omega_{ref}$, short circuiting 304 the electrical machine 10, and determining 306 d,q currents $i_d$, $i_q$ and angular velocity $\omega$ of a rotor 12 of the electrical machine 10 during deceleration from the pre-set speed value $\omega_{ref}$, $-\omega_{ref}$. The method 300 further comprises determining 308 a resolver offset $\theta_{off}$ and the time delay constant k for the time-dependent angular resolver offset $k\omega$ based on the determined d, q currents $i_d$, $i_q$ and the determined angular velocity $\omega$ of the rotor.

Figure 7:
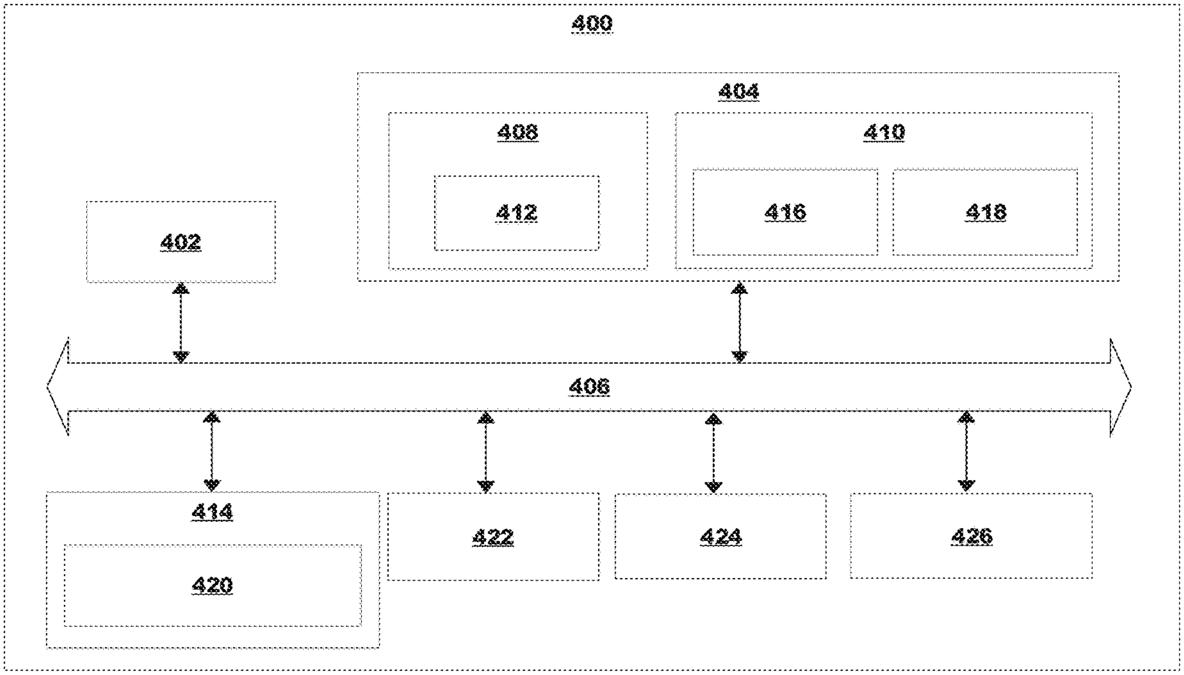
FIG. 7 is a schematic diagram of an exemplary computer system for implementing examples disclosed herein, according to an example.

FIG. 7 is a schematic diagram of a computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include processing circuitry 402 (e.g., processing circuitry including one or more processor devices or control units), a memory 404, and a system bus 406. The computer system 400 may include at least one computing device having the processing circuitry 402. The system bus 406 provides an interface for system components including, but not limited to, the memory 404 and the processing circuitry 402. The processing circuitry 402 may include any number of hardware components for conducting data or signal processing or for executing computer code stored in memory 404. The processing circuitry 402 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 402 may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processing circuitry 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with processing circuitry 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program 420 stored on a transitory or non-transitory computer-usable or computer-readable storage medium (e.g., single medium or multiple media), such as the storage device 414, which includes complex programming instructions (e.g., complex computer-readable program code) to cause the processing circuitry 402 to carry out actions described herein. Thus, the computer-readable program code of the computer program 420 can comprise software instructions for implementing the functionality of the examples described herein when executed by the processing circuitry 402. In some examples, the storage device 414 may be a computer program product (e.g., readable storage medium) storing the computer program 420 thereon, where at least a portion of a computer program 420 may be loadable (e.g., into a processor) for implementing the functionality of the examples described herein when executed by the processing circuitry 402. The processing circuitry 402 may serve as a controller or control system for the computer system 400 that is to implement the functionality described herein.

The computer system 400 may include an input device interface 422 configured to receive input and selections to be communicated to the computer system 400 when executing instructions, such as from a keyboard, mouse, touch-sensitive surface, etc. Such input devices may be connected to the processing circuitry 402 through the input device interface 422 coupled to the system bus 406 but can be connected through other interfaces, such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may include a communications interface 426 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system (100) comprising processing circuitry (160, 402) configured to: for each one of a pre-set positive speed value ($\omega_{ref}$) and a pre-set negative speed value ($-\omega_{ref}$): controlling the speed of an electrical machine (10) to the pre-set speed value ($\omega_{ref}$, $-\omega_{ref}$), short circuiting the electrical machine (10), and determining d,q currents ($i_d$, $i_q$) and angular velocity ($\omega$) of a rotor (14) of the electrical machine (10) during deceleration from the pre-set speed value ($\omega_{ref}$, $-\omega_{ref}$), and wherein the processing circuitry (160, 402) is further configured to: determining a resolver offset ($\theta_{off}$, $k\omega$) based on the determined d, q currents ($i_d$, $i_q$) and the determined angular velocity ($\omega$) of the rotor (14).

Example 2: The computer system of Example 1, wherein the absolute value of the negative speed value ($-\omega_{ref}$) equals the absolute value of the positive speed value ($\omega_{ref}$).

Example 3: The computer system of any of Example 1-2, wherein the processing circuitry is further configured to: disconnecting the electrical machine (10) from an associated load (30) prior to controlling the speed of the electrical machine (10) to the pre-set speed values ($\omega_{ref}$, $-\omega_{ref}$).

Example 4: The computer system of any of Example 1-3, wherein the processing circuitry is further configured to: calculating a correct resolver position ($\theta_{cal}$) by subtracting the resolver offset ($\theta_{off}$, $k\omega$) from the measured resolver position ($\theta_{meas}$).

Example 5: The computer system of Example 4, wherein the processing circuitry is further configured to: controlling operation of the electrical machine (10) based on the correct resolver position ($\theta_{cal}$).

Example 6: The computer system of any of Example 1-5, wherein the processing circuitry is further configured to: determining the resolver offset ($\theta_{off}$, $k\omega$) as a constant angular resolver offset ($\theta_{off}$) and a speed-dependent angular resolver offset ($k\omega$).

Example 7: The computer system, wherein the processing circuitry is further configured to: determining the constant angular resolver offset $$(\theta_{off})$$

as $$\theta_{off} = \frac{\arctan2(i_q(\omega), i_d(\omega)) + \arctan2(i_q(-\omega), i_d(-\omega))}{2} - \pi.$$

Example 8: The computer system of any of Examples 6-7, wherein the processing circuitry is further configured to: determining the speed-dependent angular resolver offset as $$k\omega,$$

where $$k = \frac{1}{2\omega}\Bigg(\arctan2\,(i_q(\omega), i_d(\omega)) - \arctan2\,(i_q(-\omega), i_d(-\omega)) - \arctan2\left(-\psi_{PM}\frac{R}{L_d L_q \omega + \frac{R^2}{\omega}}, -\psi_{PM}\frac{L_q}{L_d L_q + \frac{R^2}{\omega^2}}\right) +$$

-continued $$\left.\arctan 2\left(-\psi_{PM}\frac{R}{-L_dL_q\omega+\frac{R^2}{-\omega}}-\psi_{PM}\frac{L_q}{L_dL_q+\frac{R^2}{\omega^2}}\right)\right).$$

Example 9: The computer system of Example 1, wherein the absolute value of the negative speed value ($-\omega_{ref}$) equals the absolute value of the positive speed value ($\omega_{ref}$), and wherein the processing circuitry is further configured to: calculating a correct resolver position ($\theta_{cal}$) by subtracting the resolver offset ($\theta_{off}$, $k\omega$) from the estimated resolver position ($\theta_{meas}$); controlling operation of the electrical machine (10) based on the correct resolver position ($\theta_{cal}$); determining the resolver offset ($\theta_{off}$, $k\omega$) as a constant angular resolver offset ($\theta_{off}$) and a speed-dependent angular resolver offset ($k\omega$); determining the constant angular resolver offset $$(\theta_{off})$$

as $$\theta_{off}=\frac{\arctan 2(i_q(\omega),\,i_d(\omega))+\arctan 2(i_q(-\omega),\,i_d(-\omega))}{2}-\pi;$$

determining the speed-dependent angular resolver offset as $k\omega$, where $$k=\frac{1}{2\omega}\Bigg(\arctan 2\,(i_q(\omega),\,i_d(\omega))-\arctan 2\,(i_q(-\omega),\,i_d(-\omega))-\arctan 2\left(-\psi_{PM}\frac{R}{L_dL_q\omega+\frac{R^2}{\omega}},\,-\psi_{PM}\frac{L_q}{L_dL_q+\frac{R^2}{\omega^2}}\right)+\arctan 2\left(-\psi_{PM}\frac{R}{-L_dL_q\omega+\frac{R^2}{-\omega}},\,-\psi_{PM}\frac{L_q}{L_dL_q+\frac{R^2}{\omega^2}}\right)\Bigg).$$

Example 10: A vehicle (1) comprising the computer system (100, 400) of any of Examples 1-9.

Example 11: The vehicle of Example 10, further comprising: an electrical machine (10) comprising a resolver (12) and at least one load (30) connected to the electrical machine (10), wherein the computer system (100, 400) is configured to determine the constant angular resolver offset ($\theta_{off}$) and the speed-dependent angular resolver offset ($k\omega$) of the resolver (12) of the electrical machine (10).

Example 12: A computer-implemented method (200, 300), comprising: for each one of a pre-set positive speed value ($\omega_{ref}$) and a pre-set negative speed value ($-\omega_{ref}$): controlling (206, 218, 302), by the processing circuitry, the speed of an electrical machine (10) to the pre-set speed value ($\omega_{ref}$, $-\omega_{ref}$), short circuiting (208, 220, 304), by the processing circuitry, the electrical machine (10), and determining (212, 224, 306), by the processing circuitry, d,q currents ($i_d(\omega)$, $i_q(\omega)$) and angular velocity ($\omega$) of a rotor (14) of the electrical machine (10) during deceleration from the pre-set speed value ($\omega_{ref}$, $-\theta_{ref}$), wherein the method further comprises: determining (226, 308), by the processing circuitry, a resolver offset ($\theta_{off}$, $k\omega$) based on the determined d, q currents ($i_d$ ($\omega$), $i_q(\omega)$) and the determined angular velocity ($\omega$) of the rotor (14).

Example 13: The method of Example 12, further comprising: disconnecting (202), by the processing circuitry, the electrical machine (10) from an associated load (30) prior to controlling the speed of the electrical machine (10) to the pre-set speed values ($\omega_{ref}$, $-\omega_{ref}$), and calibrating, by the processing circuitry, the resolver position based on the resolver offset ($\theta_{off}$, $k\omega$).

Example 14: A computer program product comprising program code for performing, when executed by the processing circuitry, the method of any of Examples 12-13.

Example 15: A non-transitory computer-readable storage medium comprising instructions, which when executed by the processing circuitry, cause the processing circuitry to perform the method of any of Examples 12-13.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A computer system comprising processing circuitry configured to: for each one of a pre-set positive speed value and a pre-set negative speed value: control the speed of an electrical machine to at least one of the pre-set speed values, short circuit the electrical machine, and determine d, q currents and angular velocity of a rotor of the electrical machine during deceleration from the at least one pre-set speed value, and wherein the processing circuitry is further configured to: determine a resolver offset based on the determined d, q currents and the determined angular velocity of the rotor as a constant angular resolver offset and a speed-dependent angular resolver offset.

2. The computer system of claim 1, wherein an absolute value of the negative speed value equals an absolute value of the positive speed value.

3. The computer system of claim 1, wherein the processing circuitry is further configured to:

disconnect the electrical machine from an associated load prior to controlling the speed of the electrical machine to the at least one pre-set speed value.

4. The computer system of claim 1, wherein the processing circuitry is further configured to:

calculate a correct resolver position by subtracting the resolver offset from a measured resolver position.

5. The computer system of claim 4, wherein the processing circuitry is further configured to:

control operation of the electrical machine based on the correct resolver position.

6. The computer system of claim 1, wherein the processing circuitry is further configured to:

determine the constant angular resolver offset as $$\theta_{off} = \frac{\arctan2(i_q(\omega), i_d(\omega)) + \arctan2(i_q(-\omega), i_d(-\omega))}{2} - \pi.$$

7. The computer system of claim 1, wherein the processing circuitry is further configured to:

determine the speed-dependent angular resolver offset as kω, where $$k = \frac{1}{2\omega}\left(\arctan2\,(i_q(\omega), i_d(\omega)) - \arctan2\,(i_q(-\omega), i_d(-\omega)) - \arctan2\left(-\psi_{PM}\frac{R}{L_dL_q\omega + \frac{R^2}{\omega}}, -\psi_{PM}\frac{L_q}{L_dL_q + \frac{R^2}{\omega^2}}\right) + \arctan2\left(-\psi_{PM}\frac{R}{-L_dL_q\omega + \frac{R^2}{-\omega}}, -\psi_{PM}\frac{L_q}{L_dL_q + \frac{R^2}{\omega^2}}\right)\right).$$

8. The computer system of claim 1, wherein an absolute value of the negative speed value equals an absolute value of the positive speed value, and wherein the processing circuitry is further configured to:

disconnect the electrical machine from an associated load prior to controlling the speed of the electrical machine to the at least one pre-set speed value;

calculate a correct resolver position by subtracting the resolver offset from an estimated resolver position;

control operation of the electrical machine based on the correct resolver position;

determine the resolver offset as a constant angular resolver offset and a speed-dependent angular resolver offset;

determine the constant angular resolver offset as $$\theta_{off} = \frac{\arctan2(i_q(\omega), i_d(\omega)) + \arctan2(i_q(-\omega), i_d(-\omega))}{2} - \pi;$$

and determining the speed-dependent angular resolver offset as kω, where $$k = \frac{1}{2\omega}\left(\arctan2\,(i_q(\omega), i_d(\omega)) - \arctan2\,(i_q(-\omega), i_d(-\omega)) - \arctan2\left(-\psi_{PM}\frac{R}{L_dL_q\omega + \frac{R^2}{\omega}}, -\psi_{PM}\frac{L_q}{L_dL_q + \frac{R^2}{\omega^2}}\right) + \arctan2\left(-\psi_{PM}\frac{R}{-L_dL_q\omega + \frac{R^2}{-\omega}}, -\psi_{PM}\frac{L_q}{L_dL_q + \frac{R^2}{\omega^2}}\right)\right).$$

9. A vehicle comprising the computer system of claim 1.

10. The vehicle of claim 9, further comprising:

the electrical machine comprising the resolver and at least one load connected to the electrical machine, wherein the computer system is configured to determine the constant angular resolver offset and the speed-dependent angular resolver offset of the resolver of the electrical machine.

11. A computer-implemented method, comprising: for each one of a pre-set positive speed value and a pre-set negative speed value: controlling, by processing circuitry, the speed of an electrical machine to the pre-set speed value, short circuiting, by the processing circuitry, the electrical machine, and determining, by the processing circuitry, d, q currents and angular velocity of a rotor of the electrical machine during deceleration from the pre-set speed value, wherein the method further comprises: determining, by the processing circuitry, a resolver offset based on the determined d, q currents and the determined angular velocity of the rotor as a constant angular resolver offset and a speed-dependent angular resolver offset.

12. The method of claim 11, further comprising:

allowing the electrical machine to rotate freely during deceleration from the at least one pre-set speed value.

13. The method of claim 11, further comprising: short-circuiting, by the processing circuitry, at least one phase winding of the electrical machine.

14. The method of claim 11, further comprising:

determining, by the processing circuitry, the resolver offset based on the determined d, q currents for the positive speed values and the negative speed values, and based on the determined angular velocity of the rotor for the positive speed values and the negative speed values.

15. The method of claim 11, further comprising: determining, by the processing circuitry, d, q currents by estimating steady-state d, q voltages as zero.

16. The method of claim 11, further comprising:

calculating a correct resolver position by subtracting the resolver offset from an estimated resolver position.

17. The method of claim 11, further comprising:

disconnecting, by the processing circuitry, the electrical machine from an associated load prior to controlling the speed of the electrical machine to the at least one pre-set speed value, and calibrating, by the processing circuitry, a resolver position based on the resolver offset.

18. A non-transitory computer-readable storage medium comprising instructions, which when executed by the processing circuitry, cause the processing circuitry to perform the method of claim 11.

* * * * *